Jan. 20, 1953 N. L. OATES 2,626,037
PREFEED TABLE AND CONVEYER FOR FISH DRESSING MACHINES
Filed Oct. 25, 1948 4 Sheets-Sheet 1
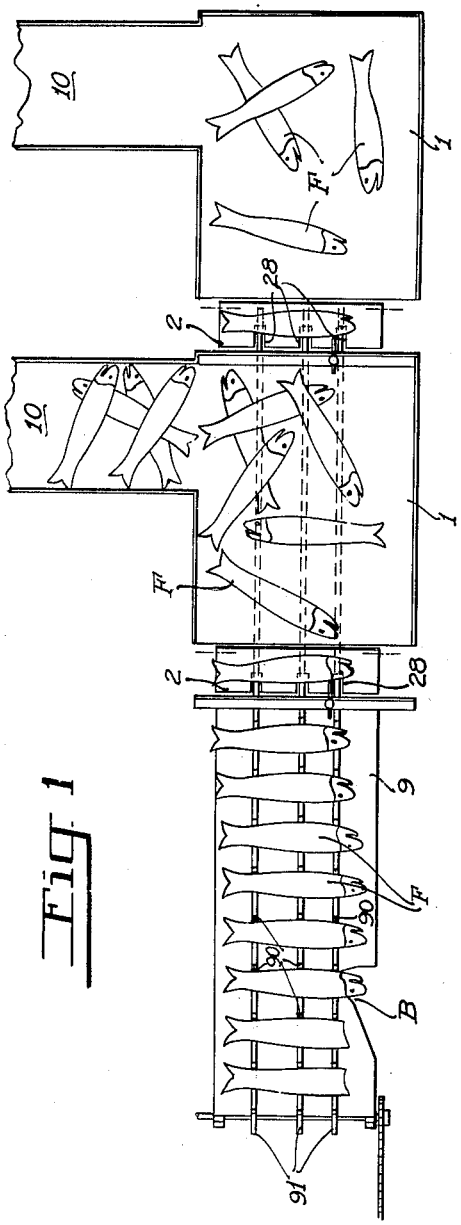
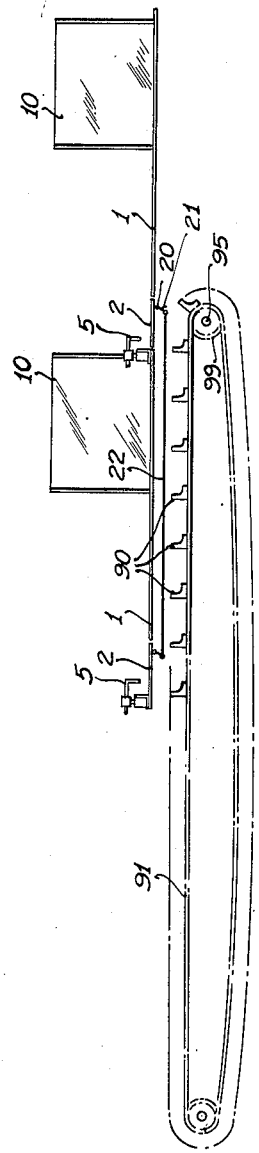
INVENTOR.
NORFORD L. OATES
BY
Reynolds Beach
ATTORNEYS Jan. 20, 1953 N. L. OATES 2,626,037
PREFEED TABLE AND CONVEYER FOR FISH DRESSING MACHINES
Filed Oct. 25, 1948 4 Sheets-Sheet 2
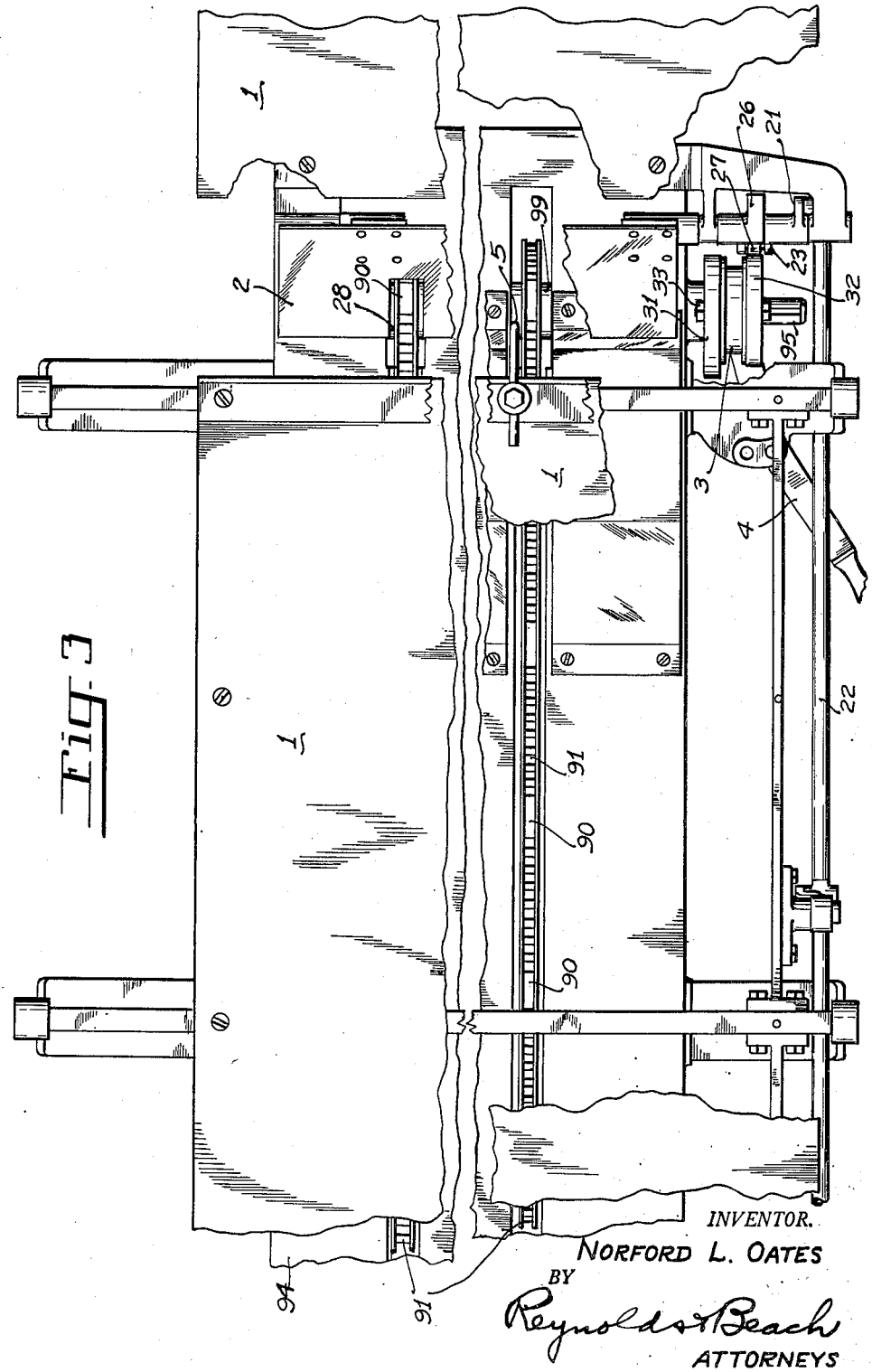
INVENTOR.
NORFORD L. OATES
BY
Reynolds Beach
ATTORNEYS Jan. 20, 1953 N. L. OATES 2,626,037
PREFEED TABLE AND CONVEYER FOR FISH DRESSING MACHINES
Filed Oct. 25, 1948 4 Sheets-Sheet 3
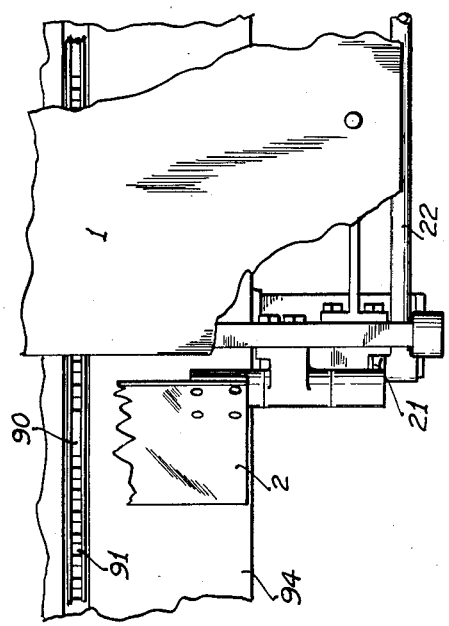
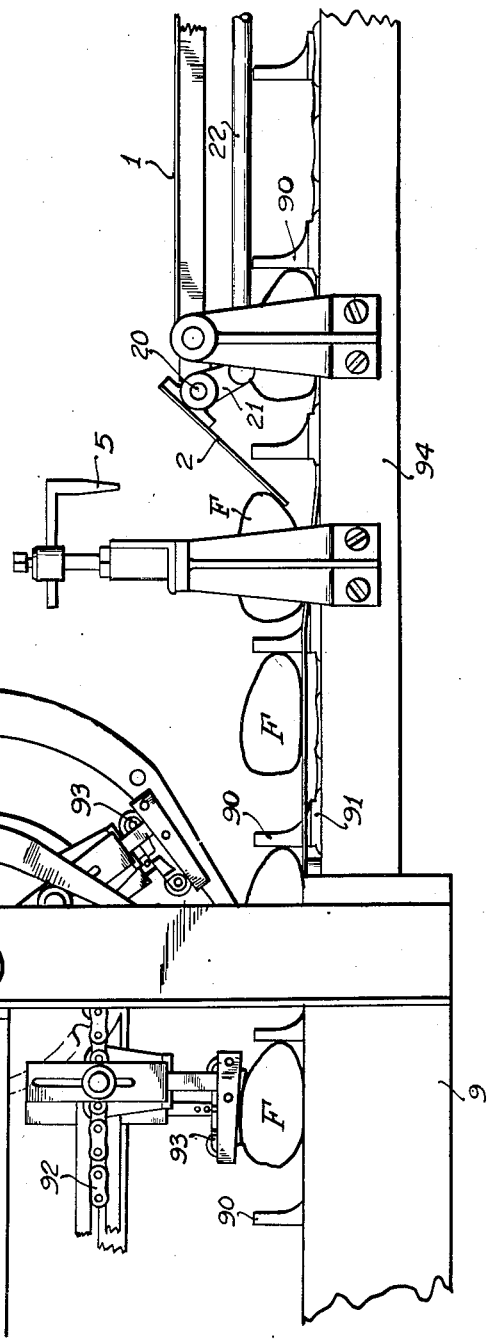
INVENTOR.
NORFORD L. OATES
BY
Reynolds & Beach
ATTORNEYS Jan. 20, 1953     N. L. OATES     2,626,037
PREFEED TABLE AND CONVEYER FOR FISH DRESSING MACHINES
Filed Oct. 25, 1948     4 Sheets-Sheet 4
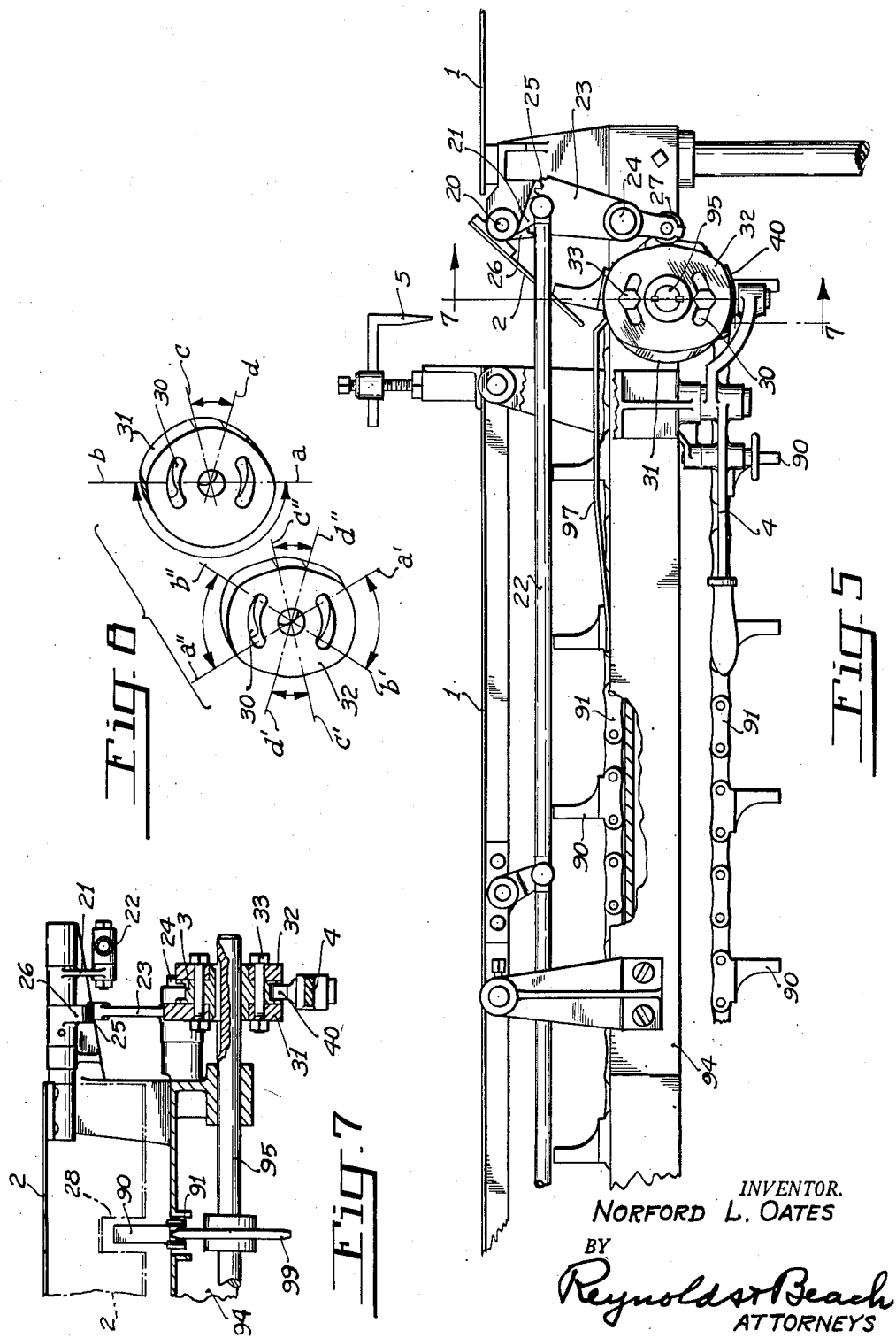
INVENTOR.
NORFORD L. OATES
BY
ATTORNEYS Patented Jan. 20, 1953

2,626,037

UNITED STATES PATENT OFFICE 2,626,037

PRE-FEED TABLE AND CONVEYER FOR FISH DRESSING MACHINE

Norford L. Oates, Seattle, Wash., assignor to Smith Cannery Machines Company, Seattle, Wash., a corporation of Washington Application October 25, 1948, Serial No. 56,367

4 Claims. (Cl. 198—26)

As a preliminary to their canning salmon are fed to and about the periphery of a fish-dressing machine, where they are slit open and the entrails removed, and the fish brushed and cleansed; in order to deliver them properly to the fish-dressing machine they are advanced by positive and closely spaced pusher means which are incorporated in a feed table. During their advance along the feed table toward the fish-dressing machine, disposed transversely of their direction of advance, heads all at one side and bellies rearward, they are accurately positioned in the direction of their length, and are then beheaded. The individual fish which are thus dressed run from two pounds up to about twenty pounds, but occasionally extra large fish are received, and it is desirable to run them through the feeder table and fish-dressing machine. This is the exception, but it is desirable that the mechanism whereby the fish are handled be capable of handling such exceptionally large fish when desired.

The fish arrive at the cannery by barge in a heterogeneous mass, and are delivered thus to the feed operators at the feed table, often by conveyors or chutes, in appreciable numbers, but still without order or arrangement, and must be arranged on the feed table by these operators; all the fish must have their heads directed to the same side; all must have their bellies facing the same; all must have their pectoral girdles approximately correctly located for the subsequent beheading operation. They must be delivered upon the feeder table singly, at definite time and space intervals determined by the rate of operation for which the machine is set, normally not less than one hundred fish a minute and often as many as one hundred fifty, and the spacing of the pusher means in the feed table, about eight inches in a widely used machine. It is a very appreciable job to turn even the smaller sizes of such slippery fish end for end, to flop them over from side to side, and to locate them and place them upon the feed table in position for engagement by the positively moving feeder or pusher means, at the high rate of speed which is frequently desirable. The feed rate is normally higher as the fish are smaller, hence while smaller fish are more easily handled, they must be handled more rapidly. Particularly is their handling and positioning difficult in the case where, according to prior practice, there is only room for a single operator to work at the feed end of the feed table. Nevertheless, it is futile to run the feed table and the fish-dressing machine at a rate of speed up to one hundred fifty fish a minute if the operator feeding the fish to the machine is unable to keep up with this speed, yet failure to do so slows the entire operation below its intended and most efficient speed or necessitates the employment of additional machinery, space, and operators.

With some of the larger fish their length is so great as to be in excess of the length allotted to each fish upon the fish-dressing machine, and for this reason, and other reasons, it is necessary to feed fish to the fish-dressing machine only in the alternate spaces, and to leave the intervening lengths or spaces unoccupied, to receive or accommodate part of the overhang which is the excess length of the extra large fish. While ordinarily the rate of feed is slowed down when handling such extra large fish, their very size increases the difficulty of handling them, and even at a rate of speed of fifty fish a minute it is still not an easy task, especially for a single operator, to feed twenty-five pound fish in correct succession, and over considerable periods of time, to the feed table. Nevertheless any vacant feed space which should have been occupied by fish and which is not, is just that much waste capacity, and slows down the entire operation.

Accordingly it is an object of the present invention to provide a prefeed or arranging table, whereon, quite apart from the feed table itself, one or two operators may segregate individual fish from the heterogeneous mass delivered thereupon, turn them or flop them over as may be required, and locate them individually for subsequent automatic feed in such timed and spaced relationship to the positive pusher means, and to fish previously or subsequently delivered to the feed table, as will cause them to occupy substantially all available space or so much thereof as it is desired to occupy, and to enable this end to be accomplished with a minimum of physical effort, a maximum of convenience and accuracy, without additional labor, and at speeds consonant with the normal or even the abnormally high rates of feed required of the feed table and fish-dressing machine.

In particular it is an object to provide mechanism of the nature indicated which will be simple and conveniently arranged for operation by one feeder or by two feeders, as the situation may require, and which is adjustable to feed a maximum number of fish in a minimum of time, or a smaller number of fish in greater time, as might be required for the extra large fish, and which can be adjusted to intermediate speeds and conditions.

It is still a further object to provide such prefeed mechanism which will require a minimum of additional floor space, for this is scarce in such cannery installations, and which is well adapted for use in conjunction with standard fish-dressing machines and feed tables therefor, and which can be correctly and in simple manner synchronized with the same, and adjusted somewhat for more exact synchronization.

With these objects in mind, and others as will appear hereinafter, my invention comprises the novel prefeed table, and the novel combination of the same with a feed table for fish-dressing machines, as shown in the accompanying drawings, described in this specification, and as will be more particularly pointed out and defined in the claims.

In the accompanying drawings the invention is shown embodied in a typical form such as is presently preferred by me.

Figure 1 is a plan view, and Figure 2 a side elevation, each on a small scale, of the feeder table and the prefeed table associated therewith. Much of the framework and drive mechanism, and all of the beheading knife, has been omitted or shown diagrammatically in these views.

Figure 3 is a plan view, broken away in many respects, to illustrate the relationship between the arranging table and the feed table.

Figure 4 is a side elevation of an inner end, and Figure 5 is a similar side view of the outer end, of the feed table and arranging table.

Figure 6 is a top plan view of a detail broken away in and hence largely omitted from Figure 3, the figure being oriented with relation to corresponding parts in Figure 6.

Figure 7 is a transverse sectional view of a detail of the feed table and arranging table, the line of section being indicated at 7—7 in Figure 5.

Figure 8 is a diagrammatic isometric view, illustrating the relationship between and the functions of the cam members alternatively usable.

The type of feed table with which the present device is designed to cooperate is disclosed in my copending application Serial No. 782,865, filed October 29, 1947. It is not intended to imply that the prefeed table may not, or is not well adapted to, cooperate with other types of feed table, but the type disclosed in the application referred to may be taken as typical of feed tables in common use with which the present prefeed table is particularly intended to cooperate.

In such a table feed chains 91, movably submerged in slots extending lengthwise of the table 9, support at regular, short intervals groups of upstanding pushers or lugs 90. The spacing of these lugs 90, usually eight inches, determines the spacing apart of the individual fish as they advance toward a beheading point B (see Figure 1). Timed with the chains 9 are overhead chains 92 (see Figure 4), which support hold-down means and fish shifting means, the latter indicated by the numeral 93, which engage individual fish F behind the pectoral girdle, and by movement of such fish shifting means 93 in the direction of the fish's snout while in engagement with the fish, and while the fish is advancing under the influence of the lugs 91 lengthwise of the table 9 (mechanism to this end is not herein shown but is disclosed in greater detail in the copending application referred to), each fish is shifted until its pectoral girdle is in precisely correct location with respect to the beheading point, for beheading of the fish with a minimum of wastage of usable flesh. To enable the shifter means 93 to operate thus it is only necessary that the fish, when placed upon the feed end of the feed table, be located approximately correctly with respect to the beheading point, not too far toward its snout end, nor too far toward its tail end. The range is normally some two inches or more, which is readily capable of accomplishment even at the maximum rate of feed.

It will be evident that it is usually, or at least frequently desirable that each lug space be filled with one fish, properly located and oriented, and that this be done at speeds ranging from a minimum of about fifty per minute to a maximum of one hundred fifty per minute. Since the fish are delivered to the feed attendant in a heterogeneous mass, and in appreciable quantities at one time, it will be evident that it is humanly impossible to maintain any such placement in front of every set of lugs 90 for more than a brief period. The best the operator can be expected to do is to orient and position the fish correctly, without concerning himself with synchronizing them with every lug space. The present invention, then, concerns itself with the problem of simplifying the feed attendant's operations, so that they become almost mechanical, and correct placement of the fish can be accomplished in the brief instants of time permitted, without thought on the part of the attendant of synchronization of his movements with the lug spaces of the machine, leaving to automatic means the maintenance of synchronism between the deposit of individual fish upon the feed table and the arrival behind the fish of the next empty lugspace. Thus the operator can normally keep somewhat ahead of the machine and if he needs more time to locate properly any given fish, he need not skip a lug space that should be filled.

It has been attempted heretofore to accomplish this deposit of individual fish in succeeding lug spaces by the use of segregator means more or less positively engaging each fish to advance it, while holding back others which are ready and are being urged in the direction of such deposit and advancement. However, the fish vary appreciably in size, and in condition. Some are firm to the point of stiffness, while others are soft and flabby. These and other differences make it extremely difficult to maintain a sufficiently reliable and continuous feed to maintain the feed table and the fish dressing machine beyond it operating at the desired top efficiency. It has been found necessary to provide means to deposit individual fish upon the feed table singly, which will operate independently of variations in size, condition, and other characteristics of the fish, and the present device admirably accomplishes those ends.

Because of the employment of the overhead chains 92, and the mechanism supporting, driving, and guiding the same, it is preferable that the feed table 9 be extended, as indicated at 94, beyond its normal point of beginning, for the purpose of providing an area upon which to deposit fish from the prefeed table 1, which is located immediately above this extension 94 of the feed table. If, on the other hand, the overhead fish controlling and shifting mechanism were to be redesigned, or eliminated, it would be possible to locate the prefeed table 1 over the feed table 9 itself, in which case no appreciable additional floor space would be required. When the feed table is thus extended at 94 the chains 91 are merely lengthened, and their sprocket wheels 99 are carried upon the shaft 95, as best shown in Figures 2 and 7. In this way the lug chains 91 run lengthwise of the feed table and its extension beneath the prefeed or arranging table 1, and fish may be deposited from the prefeed table 1 upon the feed table extension in the individual lug spaces by gravity, after having been delivered in the same manner to the prefeed table 1 by chutes 10, as best shown in Figures 1 and 2.

It will be convenient in most cases to provide a prefeed table 1 in two sections, to which two chutes 10 may deliver fish. Each section is of sufficient area to permit the feed operator to sort out and arrange his fish, turning them end for end or flopping them over as may be required to locate the head nearest him and the belly rearmost in the direction of feed. At one side of each prefeed table section is located a platform or trap door 2, which is supported, hingedly, for example, at 20, to tilt downwardly or otherwise move to deposit a fish which may be resting upon it, upon the feed table 9 or 94. Normally the platform 2 is held upraised, substantially in the same plane as the arranging table 1, or at any event so located with respect to the latter as to be convenient for the reception of individual fish slid from the prefeed table onto the platform. Thus if the platform 2 is hingedly mounted at 20 it may be held uplifted to horizontal position, and may be tilted downwardly at proper time intervals, by means of a crank arm 21 fast upon the tilting shaft 20, and connected by a rod 22 to the crank arm 21 of the second platform, where two are used. One of these shafts 20 is positively tiltable by such means as an actuating lever 23, pivotally mounted at 24, and shown as gear-connected at 25 to a crank arm 26 fast upon this particular shaft (see Figure 5), the actuating lever 23 carrying a cam follower 27, which rides upon and is actuated by one of two cams upon the shaft 95.

The two cams are shown in Figure 8, and are intended to be alternatively used. Each is received upon the shaft 95, but is secured thereto only through the medium of a mounting member 3 which is keyed to or otherwise slidable along and rotative with the shaft 95. Cam 31 produces a certain sequence of operation, which will be explained hereinafter, and cam 32 produces a somewhat different sequence of operation. Cam 31 may be designated the single cam, and cam 32 the double cam. Each is angularly adjustable somewhat with relation to the common mounting member 3 by means such as the slots 30 and bolts 33. The cams and their mounting members 3 are shiftable along the shaft 95 into position to engage one cam or the other with the cam follower 27, by means of the shifter lever 4, which through a yoke 40 engages a circumferential groove in the mounting member 3.

Considering first the single cam 31, and assuming that it rotates in the counter clockwise direction as viewed in Figures 5 and 8, from $a$ to $b$ (Figure 8) its periphery is circular, and it will retain the trap doors 2 upraised in substantially level position in the same plane as the arranging table 1. From $b$ to $c$ its radial extent decreases sufficiently to permit the platforms 2 to tilt downwardly, whereby to deposit any fish which was resting thereon upon the feed table 9 or its extension 94. Because the cams are upon the same shaft 95 as that which carries the sprocket wheels supporting the feed chains 91, it is obvious that the down tilting of the platforms 2 is in synchronism with the feed chains 91, and the arrangement is such that each supported fish is slid downwardly off a tilted platform 2 to come to rest upon or just above the feed table immediately in advance of an oncoming set of lugs 90 in an unoccupied lug space. The cam is cylindrical between $c$ and $d$ to hold the trap door downtilted long enough for the fish to slide off, and to be engaged and advanced by the oncoming lugs 90, and then from $d$ to $a$ its radial extent increases to tilt the trap door 2 upwardly again. While the trap door is thus tilted upwardly the operator slides onto it from the prefeed table 1 a fish which he has already arranged and oriented correctly, and after he has located the fish upon the platform he need concern himself no further with it, and specifically he need concern himself not at all with synchronization. Immediately the feed operator may give his attention to the next fish, to turn it, flop it, and orient it as he may need to, and to get it ready to slide upon the platform after the platform has delivered the previously arranged fish, and has been upraised again.

It will be observed that there is a depending pointer 5 adjacent each such platform, which is adjustable transversely of the feed table, that is to say, in the direction of the length of each fish. Its purpose is to provide a convenient sight gauge for visual registry with the pectoral girdle or gill of the fish, so that the feed operator may locate the fish more or less accurately within the range of operation of the fish shifting devices 93 for beheading.

It will be noted that each platform is provided with notches 28, through which the oncoming lugs 90 will pass when the platform is downtilted, and thus is assured that the fish will be engaged by the lugs and advanced somewhat before the platform must rise again, for unless this were the case the uptilting of the platform might disturb the previous arrangement or orientation of the fish.

It will be observed, too, that there are provided upraised skids 97 (see Figure 5) whereon the fish are deposited from the platforms 2, rather than to permit the fish to be deposited directly upon the moving feed chains 91. This again is for the purpose of preventing the chains from disturbing the arrangement and orientation of the fish, so that the only elements engaging and active to advance the fish are the lugs 90.

The double cam 32 is similar to the single cam 31, save that it accomplishes two complete tiltings of the platforms for each revolution of the shaft 95 instead of one. From $a'$ to $b'$ the trap door is held upraised. From $b'$ to $c'$ it is tilted downwardly, and is held thus downtilted from $c'$ to $d'$. From $d'$ to $a''$ the door is raised again, and from $a''$ to $b''$ it is held upraised. From $b''$ to $c''$ the door is downtilted, and from $c''$ to $d''$ it is held down. From $d''$ to $a'$ it is in process of being upraised.

The single cam 31 will ordinarily be employed when it is desired to fill every lug space with medium to large fish, permitting operation at a rapid feed rate, up to, for example, one hundred fifty fish a minute. Both feed stations—that is, both platforms 2—are then employed, and the spacing between them is such that one of them feeds into every other lug space, while the other feeds into the alternate lug spaces skipped by the feed from the first platform. If only one feed station is employed with the single cam 31, it is obvious that alternate lug spaces will be filled, and that this is a convenient form of feed for extra large fish. Due to the difficulty of handling such extra large fish, ordinarily the rate of feed would be slowed down to perhaps seventy fish or even fifty fish a minute. However, if for any reason it is desired to feed medium to large fish in alternate spaces the same can be accomplished by the use of a single feed station, and the feed rate can be up to one hundred fifty fish a minute.

If it is desired to slow down the feed rate, and yet to fill each lug space with medium to large fish, one feed station is employed with the double cam 32, and by reason of the slowing down of the feed rate one operator may, at a single station, arrange and feed the fish, even though they are of medium to large size. If the fish are smaller, and therefore more easily handled, the feed rate may be increased, even to the maximum, and a single operator using the double cam 32, may still keep every lug space filled with these small fish. The synchronism between the cams and the feed chain is such that two lugs are advanced past a given point for each revolution of the shaft 95 and sprocket wheels 99, and so it follows that where it is desired to feed into every lug space from a single station the double cam, accomplishing two feed operations per revolution of the shaft 95, must be employed, and that if two feed operations per revolution of the shaft are required from the two feed stations, only the single cam 31 can be used, and then one feed operation per revolution from each station is so synchronized with the feed operation from the other station that all stations can be filled, and neither operator is unduly pressed to keep up.

The mechanism described and forming the subject matter of this application has been tested in actual operation, and it has been found that an operator, or two operators, as the case may be, can very efficiently, conveniently, and without undue fatigue, feed fish to the feeder table, with each fish in correct position, and with few vacant lug spaces, over appreciable periods of time, at an optimum speed of operation. In so doing the entire mechanism, and the can-filling devices dependent for their supply upon the fish-dressing mechanism, can be operated at maximum efficiency, and at top speed, which is extremely important in handling a product such as this, high in value, susceptible of spoiling unless promptly processed, and which in a short season must be handled in tremendous quantities.

I claim as my invention:

1. In combination with a feed table which includes spaced pusher elements movable therealong at a predetermined rate and spacing, thereby to engage and advance individual fish or the like, an arranging table operatively adjoining such feed table, whereon fish or the like are delivered heterogeneously, means at one side of the arranging table to receive therefrom and support successive single fish or the like, and shiftable from a delivering position to a retaining position, and the reverse, dual actuating means operable in synchronism with the advance of said pusher elements along the table for shifting said receiving means at predetermined intervals positively into and from delivering position, and thus to deliver single fish or the like at such time intervals as will deposit them upon the feed table at predetermined spacings, one of said dual actuating means being arranged for actuation at spacings such as to effect delivery in advance of each successive pusher element, and the other thereof being arranged for actuation at spacings such as to effect delivery in advance of alternate pusher elements, skipping the intervening pusher elements, and control means for operatively connecting either one of said actuating means with said receiving means.

2. In combination with a feed table for fish, which includes spaced pusher elements movable therealong at a predetermined rate and spacing, thereby to engage and advance individual fish, an arranging table located adjacent and above the level of the feed end of said feed table, whereon fish are delivered heterogeneously, two tiltable platforms, spaced lengthwise of the feeder table, located adjacent the arranging table in position to receive fish slid therefrom, both overlying the feed table, and each of a size to receive individual fish, means normally supporting each platform in upraised, fish-supporting position, and means operable in synchronism with said pusher means to tilt each platform to deposit a fish from each platform upon the feed table in advance of and for engagement by alternate pusher means, and from one platform in advance of those pusher means which are skipped by the other platform, whereby upon deposition of fish from both platforms each pusher means will receive and advance one fish in timed and spaced relationship to individual fish previously and subsequently so deposited.

3. In combination with a feed table which includes pusher elements disposed at regular spacings lengthwise of the table and movable therealong, an arranging table operatively adjoin'ng such feed table, whereon the fish or the like to be fed are delivered, two means spaced lengthwise of the feed table by a distance equivalent to an odd multiple of the spacing between successive pusher elements, each to receive and support successive single fish or the like, and shiftable from a delivering position to a retaining position, and the reverse, an actuating means operatively connected to both said means for simultaneous and like actuation thereof, control means for energizing said actuating means, and itself synchronized with the advance of the pusher elements for energization of the actuating means once in every two pusher spacings.

4. The combination of claim 3, wherein the control means are dual, and are selectively engageable with the actuating means, one thereof being arranged for operation as set forth in claim 3, the other being arranged for energization of the actuating means once each pusher spacing, and means to engage selectively one or the other such control means operatively with the actuating means.

NORFORD L. OATES.

REFERENCES CITED

The following references are of record in the file of this patent:

UNITED STATES PATENTS

| Number | Name | Date |
|---|---|---|
| 533,184 | Svenson | Jan. 29, 1895 |
| 1,209,801 | Beckett | Dec. 26, 1916 |
| 1,957,321 | Criner et al. | May 1, 1934 |
| 2,311,577 | Rose | Feb. 16, 1943 |
| 2,430,605 | Francona | Nov. 11, 1947 |